United States Patent [19]

Matsumoto

[11] Patent Number: 4,742,038

[45] Date of Patent: May 3, 1988

[54] MONOLITHIC CATALYST SUPPORT AND CATALYST DEPOSITED ON THE SUPPORT

[75] Inventor: Shinichi Matsumoto, Aichi, Japan

[73] Assignee: Toyota Jidoshi Kabushiki Kaisha, Aichi, Japan

[21] Appl. No.: 933,996

[22] Filed: Nov. 24, 1986

[30] Foreign Application Priority Data

Nov. 26, 1985 [JP] Japan ............................. 60-265794
Apr. 9, 1986 [JP] Japan ............................. 61-081569

[51] Int. Cl.⁴ ..................... B01J 21/04; B01J 23/02; B01J 23/10; B01J 23/26
[52] U.S. Cl. ............................. 502/303; 502/302; 502/304; 502/306; 502/317; 502/439; 423/213.5
[58] Field of Search ............... 502/302, 439, 303, 304, 502/306, 317; 423/213.5

[56] References Cited

U.S. PATENT DOCUMENTS 3,920,583 11/1975 Pugh ............................. 502/313 X
3,944,504 3/1976 Ford et al. ..................... 502/527 X

FOREIGN PATENT DOCUMENTS 2716566 10/1977 Fed. Rep. of Germany.
3131195 5/1982 Fed. Rep. of Germany.

Primary Examiner—W. J. Shine
Attorney, Agent, or Firm—Finnegan, Henderson, Farabow, Garrett & Dunner

[57] ABSTRACT

A monolithic catalyst support for use in the purification of exhaust gases comprises: a metal substrate; an oxide membrane formed on the surface of the substrate by applying heat treatment to the substrate; and an active alumina layer formed on the oxide membrane, wherein the composition of the metal substrate is composed of from 5 to 30% by weight of chromium (Cr), from 1 to 10% by weight of aluminum (Al), from 0.1 to 0.5 by weight of one or more of potassium (K), rubidium (Rb), cesium (Cs), francium (Fr), calcium (Ca), strontium (Sr), barium (Ba), radium (Ra) and lanthanoid elements and the balance of iron (Fe). The endurance of the monolithic catalyst can be improved because incorporation of the lanthanoid elements can improve the purifying performance.

12 Claims, 3 Drawing Sheets

MONOLITHIC CATALYST SUPPORT AND CATALYST DEPOSITED ON THE SUPPORT

BACKGROUND OF THE INVENTION

1. Field of the Invention

This invention concerns a monolithic catalyst support of a monolithic catalyst for purifying exhaust gases from internal combustion engines and, more specifically, it relates to a monolithic catalyst support improved with the durability by enhancing the depositing strength of a carrier layer formed on the surface of a metal substrate for a monolithic catalyst support.

2. Description of the Prior Art

Monolithic catalysts have generally been used as catalysts for the purification of exhaust gases from internal combustion engines, particularly, automobiles engines. The monolithic catalyst usually comprises a monolithic catalyst support and catalyst ingredients carried on the support. The support usually comprises a monolithic substrate and a porous catalyst carrier layer of active alumina having large surface area formed on the surface of the monolithic substrate. It has recently been proposed to form the substrate with a heat-resistant metal comprising a composition of aluminum, iron, chromium (refer to Japanese Patent Laid-Open No. 68143/1982).

In a metal substrate, an oxide membrane such as an $\alpha$-alumina membrane is usually formed on the surface layer of the substrate by applying heat treatment to the substrate. However, since the membranes do not have a good affinity for the active alumina carrier layer fixed on this membrane, the deposition strength between the active alumina layer and the metal substrate is not sufficient thus possibly leading to the defoliation of the active alumina layer during use.

SUMMARY OF THE INVENTION

This invention has been achieved in view of the foregoing situation and it is an object of the invention to prevent the active alumina layer from detaching out of the metal substrate, by improving the depositing strength between the active alumina layer and the metal substrate in a monolithic catalyst support.

DETAILED DESCRIPTION OF THE DRAWINGS

These and other object, as well as features of this invention will become apparent by reading the following description referring to the accompanying drawings, wherein.

DETAILED DESCRIPTION OF THE INVENTION

Figure 1:
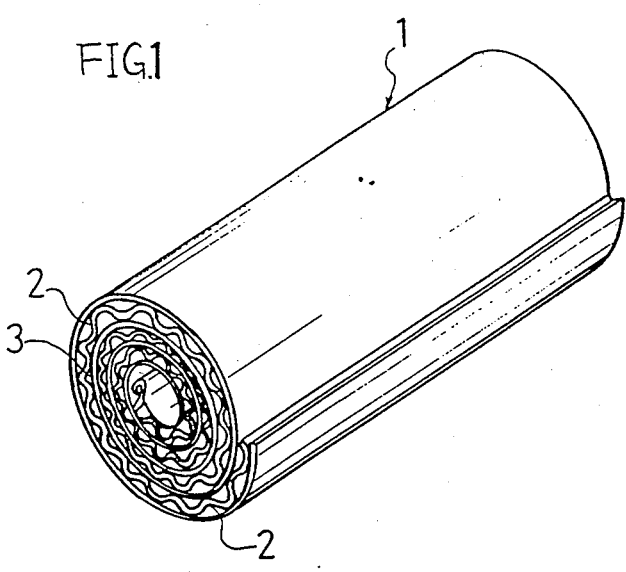
FIG. 1 is a schematic perspective view of the substrate for a monolithic catalyst support as an embodiment according to this invention.
Figure 2:
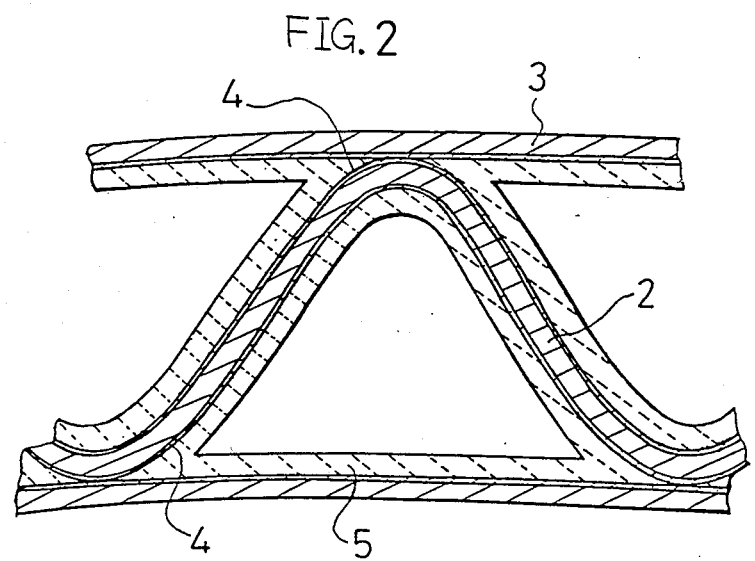
FIG. 2 is an enlarged cross sectional view of the support which comprises the substrate, an oxide membrane and an active aluminum layer.

The foregoing object can be attained in accordance with the invention of the present application by a monolithic catalyst support for use in the purification of exhaust gases comprising; a metal substrate; an oxide membrane formed on the surface of said substrate by applying heat treatment to the substrate; and an active alumina layer formed on said oxide membrane, wherein the composition of the metal substrate for the monolithic catalyst support comprises from 5 to 30% by weight of chromium (Cr), from 1 to 10% by weight of aluminum (Al), from 0.01 to 0.5% by weight of one selected from the group consisting of potassium (K), rubidium (Rb), cesium (Cs), francium (Fr), calcium (Ca), strontium (Sr), barium (Ba), radium (Ra), lanthanoid elements and a mixing thereof, and the balance of iron (Fe).

The metal substrate of the catalyst support defines the configuration of the monolithic catalyst.

The substrate is shaped, for example, by winding a thin metal sheet into a roll, and generally corrugating, folding or notching the surface of the thin metal sheet so as to provide a large surface area.

The feature of the invention lies in that the composition of the metal substrate for the catalyst support contains, from 0.01 to 0.5% by weight of potassium (K), rubidium (Rb), cesium (Cs), francium (Fr), calcium (Ca), strontium (Sr), barium (Ba) and radium (Ra) or lanthanoid elements alone or in combination.

Referring to the ionic radius of each of the elements, since the ionic radius, for example, of calcium ion ($Ca^{2+}$) (0.099 nm) is greater than the ionic radius (0.062 nm) of aluminum ion ($Al^{3+}$), these ions intrude between the lattices of active alumina such as $\gamma$-alumina, $\delta$-alumina and $\theta$-alumina of large gaps to stabilize the crystal structure.

Further, referring to the lanthanoid elements, since the ionic radius (0.106 nm) of the lanthanum ion ($La^{3+}$), for instance, is greater than the ionic radius (0.062 nm) of aluminum ion ($Al^{3+}$), the lanthanum ions intrude between the lattices of active alumina such as $\gamma$-alumina, $\delta$-alumina, $\theta$-alumina of greater gaps to stabilize the crystal structure thereof. Among the lanthanoid elements, rare earth elements (La, Ce, Pr, Nd, Pm and Sm) are particularly effective to stabilize the crystal structure of the active alumina.

The lanthanoid elements can include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). The effect of this invention can be increased by adding the lanthanoid elements in an amount from 0.001 to 0.10 mol and, more preferably, from 0.002 to 0.05 mol relative to 1 mol of aluminum.

The oxide membrane is principally formed from aluminum in the substrate by applying heat treatment to the metal substrate in an oxidative atmosphere at a temperature from 800° C. to 1,200° C.

When applying the heat treatment, conversion of active alumina such as $\gamma$-alumina, $\delta$-alumina and $\theta$-alumina into $\alpha$-alumina is suppressed by the effect of the alkali metals and alkaline earth metals such as potassium or calcium or the lanthanoid elements to hinder the deposition of $\alpha$-alumina.

DESCRIPTION OF THE PREFERRED EMBODIMENTS

Figure 3:
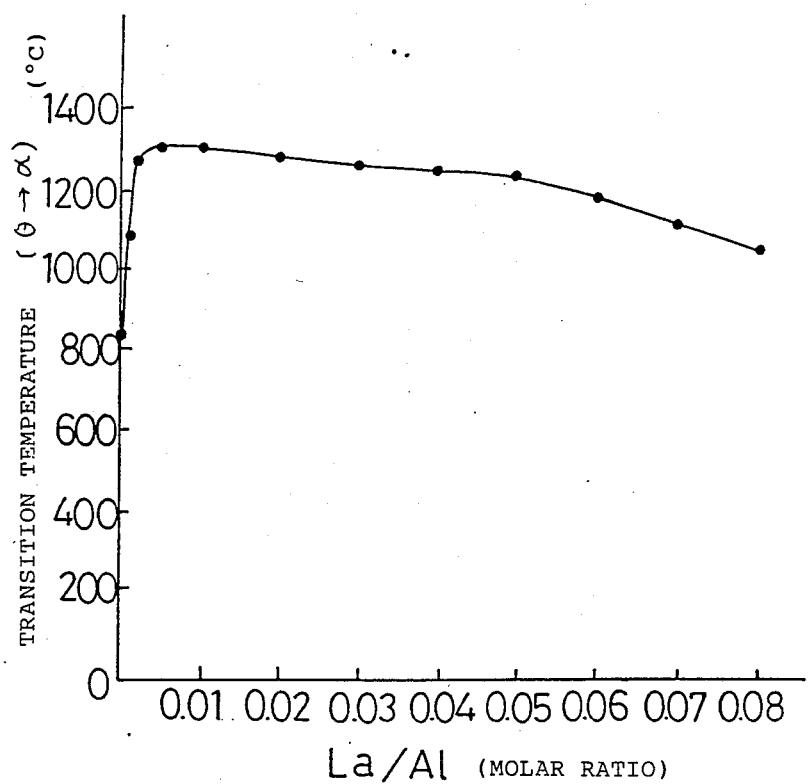
FIG. 3 is a graph showing the change of the transition temperature from $\theta$-alumina to $\alpha$-alumina in the case of varying the ratio of lanthanum added to aluminum in the substrate.

Reference is at first made to the graph of FIG. 3. The graph shows the change of the transition temperature from θ-alumina to α-alumina in the case of varying the ratio of lanthanum added to aluminum in the metal substrate. In the figure, the molar ratio of lanthanum to aluminum is shown on the abscissa, while the conversion temperature determined from the measurement for the heat of conversion is shown on the ordinate.

As can be seen from the figure, the temperature at which θ-alumina is converted into α-alumina exceeds 1,200° C. within the molar ratio range from 0.002 to 0.05, which demonstrates that the deposition of α-alumina is suppressed upon heat treatment.

Suppression for the deposition of α-alumina is observed within the molar ratio range from 0.001 to 0.1.

Figure 4:
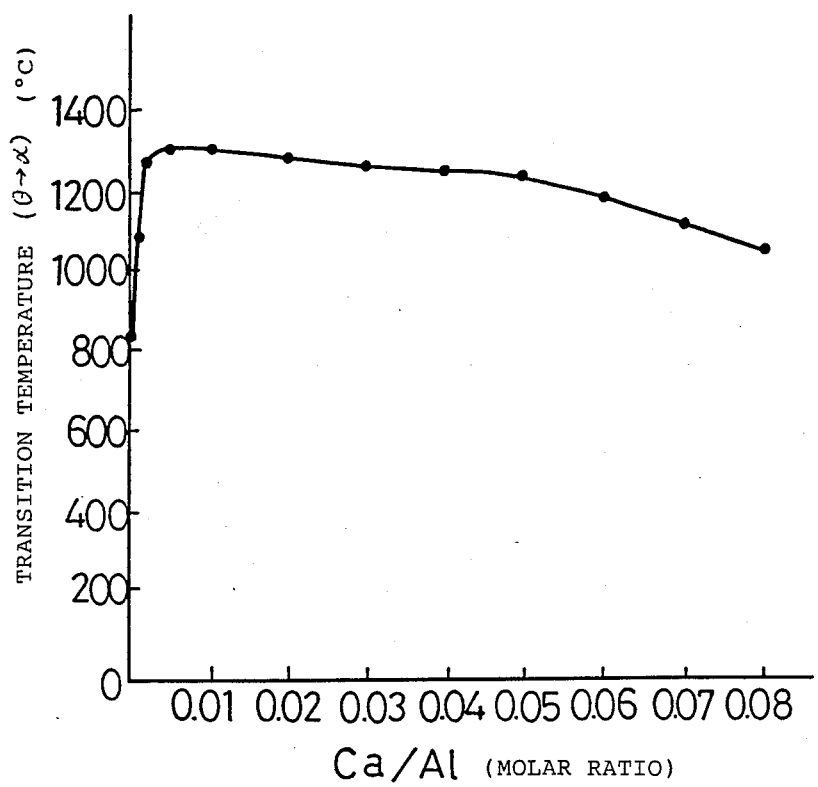
FIG. 4 is a graph showing the change of the transition temperature from $\theta$-alumina to $\alpha$-alumina in the case of varying the ratio of calcium added to aluminum in the substrate.

FIG. 4 is a graph showing the change of the transition temperature from θ-alumina to α-alumina in the case of varying the ratio of calcium added to aluminum in the substrate. In the figure, the molar ratio of calcium to aluminum is shown on the abscissa, while the conversion temperature determined from the measurement for the heat of conversion is shown on the ordinate.

As can be seen from the figure, the temperature at which θ-alumina is converted into α-alumina exceeds 1,200° C. within a molar ratio range from 0.002 to 0.05, which demonstrates that the deposition of α-alumina is suppressed upon heat treatment. Suppression for the deposition of α-alumina is observed within the molar ratio range from 0.001 to 0.1.

Further, when the alkaline earth metals (Ca, Sr, Ba, Ra), alkali metals (K, Rb, Cs, Fr) and lanthanoid elements are simultaneously incorporated into the support substrate, a perovskite type composite oxide represented by the general formula: $R_xLn_{1-x}AlO_3$ (R—Ca, Sr, Ba, Ra, K, Rb, Cs, Fr; Ln—lanthanoid elements) (for instance, $Ca_xLa_{1-x}AlO_3$) is formed and the catalytic effect can be obtained due to the $O_2$ storing capability. Upon forming the perovskite type composite oxide, a preferred molar ratio between R and Ln is: R/Ln=0.1~10.0.

The active alumina layer is fixed to the metal substrate by way of the oxide membrane described above. Since the active alumina layer is porous and has a large surface area, the catalyst ingredients are mainly supported on the active alumina layer.

Catalyst ingredients supported on the active alumina layer and the like can be constituted by the usually employed ones, e.g., noble metals such as platinium (Pt), palladium (Pa), iridium (Ir), ruthenium (Ru), osmium (Os) and the like and base metals such as chromium (Cr), nickel (Ni), vanadium (V), copper (Cu), cobalt (Co), manganese (Mn) and the like.

EXAMPLE (Preparation of monolithic catalyst support)

FIG. 1 is a schematic perspective view of a substrate for a monolithic catalyst support in one embodiment according to this invention. As shown in FIG. 1, a corrugated sheet 2 and a flat sheet 3 with each of 0.05 mm thickness made of thin metal sheet are alternately wound to form a cylindrical monolithic substrate 1. The monolithic susbstrate 1 is prepared from the thin metal sheet comprises the following composition (bases on wt%).

(1) Cr 15%, Al 5%, La 0.1% and the balance of Fe (Example 1):

(2) Cr 13%, Al 5%, La 0.5% and the balance of Fe (Example 2):

(3) Cr 14%, Al 4%, Nd 0.1% and the balance of Fe (Example 3):

(4) Cr 14%, Al 5%, Sm 0.1% and the balance of Fe (Example 4):

(5) Cr 15%, Al 5%, Ce 0.1% and the balance of Fe (Example 5):

(6) Cr 15%, Al 5%, Ba 0.1% and the balance of Fe (Example 6):

(7) Cr 15%, Al 5%, Ca 0.02%, La 0.08% and the balance of Fe (Example 7):

TABLE

| | Composition (wt %) | | | | | | Purification rate after endurance (%) | | | Defoliation rate (%) |
| | Cr | Al | Alkali metal etc. | Lanthanoide | | Fe | HC | CO | NOx | |
| --- | --- | --- | --- | --- | --- | --- | --- | --- | --- | --- |
| Example 1 | 15 | 5 | — | 0.1 | (La) | balance | 91 | 88 | 89 | 0.1 |
| Example 2 | 13 | 5 | — | 0.5 | (La) | balance | 90 | 86 | 87 | 0.5 |
| Example 3 | 14 | 4 | — | 0.1 | (Nd) | balance | 93 | 89 | 89 | 0.1 |
| Example 4 | 14 | 5 | — | 0.1 | (Sm) | balance | 92 | 88 | 88 | 0.2 |
| Example 5 | 15 | 5 | — | 0.1 | (Ce) | balance | 89 | 87 | 88 | 0.4 |
| Example 6 | 15 | 5 | 0.1 (Ba) | — | | balance | 90 | 87 | 88 | 0.1 |
| Example 7 | 15 | 5 | 0.02 (Ca) | 0.08 | (La) | balance | 93 | 92 | 89 | 0.1 |
| Example 8 | 15 | 4 | 0.01 (Ba) | 0.09 | (Nd) | balance | 92 | 93 | 90 | 0.1 |
| Example 9 | 14 | 5 | 0.1 (Sr) | 0.1 | (Sm) | balance | 94 | 92 | 89 | 0.3 |
| Example 10 | 14 | 5 | 0.01 (K) 0.01 (Ba) | 0.18 | (La) | balance | 93 | 92 | 91 | 0.3 |
| Example 11 | 15 | 5 | 0.02 (Ba) | 0.05 (Ce) 0.05 (La) | | balance | 94 | 92 | 93 | 0.1 |
| Comparative Example 1 | 15 | 5 | — | — | | balance | 84 | 82 | 80 | 11 |
| Comparative Example 2 | 13 | 4 | — | — | | balance | 81 | 79 | 78 | 27 |

(8) Cr 15%, Al 4%, Ba 0.01%, Nd 0.09% and the balance of Fe (Example 8):

(9) Cr 14%, Al 5%, Sr 0.1%, Sm 0.1% and the balance of Fe (Example 9):

(10) Cr 14%, Al 5%, K 0.01%, Ba 0.01%, La 0.18% and the balance of Fe (Example 10):

(11) Cr 15%, Al 5%, Ba 0.02%, Ce 0.05%, La 0.05% and the balance of Fe (Example 11):

(12) Cr 15%, Al 5% and the balance of Fe (Comparative Example 1):

(13) Cr 13%, Al 4% and the balance of Fe (Comparative Example 2).

Each of the monolithic substrate 1 of examples 1–11 and comparative examples 1–2 were burned in air at 800° C. for 10 hours to form an oxide membrane 4 on the surface. Active alumina, alumina-based binder and water were mixed well to make slurry and the monolithic substrate 1 having the oxide membrane 4 was immersed in the slurry for one minute. After taking out of the slurry, the monolithic substrate was subject to the air jet to blow off the excessive slurry, dried at 200° C. for one hour, and burned again at 600° C. for two hours to form an active alumina layer 5 on the oxide membrane. Thus each of the monolithic supports were prepared.

These monolithic supports were immersed in an aqueous solution of dinitrodiammine platinum ($Pt(NH_3)_2(NO_2)_2$), pulled up and dried, again immersed in an aqueous rhodium chloride solution ($RhCl_3$), pulled up and then dried. The carried amount of the platinum was 0.5% by weight relative to the active alumina layer and the carried amount of the rhodium was 0.05 wt % relative to the active alumina layer.

(Endurance Test and the Evaluation)

Catalyst samples of the examples and comparative examples were respectively attached to the exhaust system of an identical 2 liter engine and endurance test was conducted for 2,000 cycles in total, one cycle comprising exposing them with an air-fuel ratio (A/F)=14.6 to a temperature of the catalyst bed at 700° C. for one hour and at air-fuel ratio (A/F)=14.0 and to a temperature of the catalyst bed at 950° C. for 30 minutes. After applying the endurance test, each of the catalyst samples were attached to the exhaust system of an identical engine and the purification rate was measured for hydrocarbons (HC), carbon monoxides (CO) and nitrogen oxides ($NO_x$) under the conditions engine rotation at 2,000 rpm under 360 mmHg. Further, the defoliation rate in which the active alumina layer was defoliated from the metal substrate was determined: Defoliation rate (%)=(weight before the endurance test—weight after the endurance test)/(weight before the endurance test)×100

The results are shown in Table. As can be seen from the table, the defoliation rate in the Examples is lower as compared with that in the comparative Examples. Further, the purifying ratio in the examples is higher compared with that of the comparative examples, because the defoliation of the active alumina layer is lower in the examples.

When comparing Examples 1–6 with Examples 7–11, the purification rate is higher in Examples 7–11. It is considered that the perovskite type composite oxide is formed by the addition of the lanthanoid elements to exhibit the purifying effect.

In the invention, the composition of the substrate for the catalyst support is composed of from 5 to 30% by weight of chromium, from 1 to 10% by weight of aluminum, from 0.001 to 0.5% of one or more of potassium, rubidium, cesium, francium, calcium, strontium, barium, radium, lanthanoid elements and the balance of iron.

Since the ionic radius of alkali earth metals (Ca, Sr, Ba, Ra), alakali metals (k, Rb, Cs, Fr), lanthanoid elements is greater than the ionic radius of aluminum, the ions intrude between the lattice gaps of active alumina such as $\gamma$-alumina, $\delta$-alumina and $\theta$-alumina of greater gaps to stabilize the crystal structure.

Accordingly, upon forming the oxide membrane on the surface by heat treating the substrate, conversion of the active alumina into $\alpha$-alumina is suppressed by the heat treatment thereby hindering the deposition of $\alpha$-alumina. Accordingly, the alumina formed on the surface of the substrate by the heat treatment substantially comprises active alumina and has the same crystal structure as that of the active alumina of the carrier layer fixed further thereover. Further, since they are identical with thermal properties, the bonding strength between them is extremely strong to effectively prevent the carrier layer from separating out of the metal substrate and improve the durability of the monolithic catalyst support. Further, as also shown in the examples, by adding the lanthanoid elements together with the potassium, calcium, etc. the perovskite type composite oxide is formed to improve the purifying performance.

What is claimed is:

1. A monolithic catalyst support for use in the purification of exhaust gases comprising:
   a metal substrate,
   an oxide membrane formed on the surface of said substrate by treating said substrate in an oxidative atomosphere at a temperature between 800° C. and about 1200° C., said membrane containing alumina which substantially comprises active alumina, and
   an active alumina layer formed on said oxide membrane,
   wherein the composition of the metal substrate is composed of from 5 to 30% by weight of chromium, from 1 to 10% by weight of aluminum, from 0.01 to 0.5% by weight of lanthanoid elements and the balance of iron.

2. A monolithic catalyst support as defined in claim 1, wherein the lanthanoid elements are present in an amount from 0.001 to 0.1 mol relative to 1 mol of aluminum.

3. A monolithic catalyst for use in the purification of exhaust gases comprising:
   a metal substrate,
   an oxide membrane formed on the surface of said substrate by treating said substrate in an oxidative atmosphere at a temperature between 800° C. and about 1200° C., said membrane containing alumina which substantially comprises active alumina,
   an active alumina layer formed on said oxide membrane, and
   catalyst ingredients carried on at least said active alumina layer;
   wherein the composition of the metal substrate is composed of from 5 to 30% by weight of chromium, from 1 to 10% by weight of aluminum, from 0.01 to 0.5% by weight of lanthanoid elements and the balance of iron.

4. A monolithic catalyst as defined in claim 3, wherein the lanthanoid elements are present in an amount from 0.001 to 0.1 mol relative to 1 mol of aluminum.

5. A monolithic catalyst support for use in the purification of exhaust gases comprising:
   a metal substrate,
   an oxide membrane formed on the surface of said substrate by treating said substrate in an oxidative atmosphere at a temperature between 800° C. and about 1200° C., said membrane containing alumina which substantially comprises active alumina, and
   an active alumina layer formed on said oxide membrane,
   wherein the composition of the metal substrate is composed of from 5 to 30% by weight of chromium, from 1 to 10% by weight of aluminum, from 0.01 to 0.5% by weight of one selected from the group consisting of potassium, rubidium, cesium, francium, calcium, strontium, barium, radium and a mixture thereof, and the balance of iron.

6. A monolithic catalyst support as defined in claim 5, wherein said one selected from the group consisting of potassium, rubidium, cesium, francium, calcium, strontium, barium, radium and a mixture thereof is present in an amount from 0.001 to 0.1 mol relative to 1 mol of aluminum.

7. A moonolithic catalyst for use in the purification of exhaust gases comprising:
a metal substrate,
an oxide membrane formed on the surface of said substrate by treating said substrate in an oxidative atmosphere at a temperature between 800° C. and about 1200° C., said membrane containing alumina which substantially comprises active alumina,
an active alumina layer formed on said oxide membrane, and
catalyst ingredients carried on at least said active alumina layer,
wherein the composition of the metal substrate is composed of from 5 to 30% by weight of chromium, from 1 to 10% by weight of aluminum, from 0.01 to 0.5% by weight of one selected from the group consisting of potassium, rubidium, cesium, francium, calcium, strontium, barium, radium and a mixture thereof, and the balance of iron.

8. A monolithic catalyst as defined in claim 7, wherein said one selected from the group consisting of potassium, rubidium, cesium, francium, calcium, strontium, barium, radium and a mixture thereof is present in an amount from 0.001 to 0.1 mol relative to 1 mol of aluminum.

9. A monolithic catalyst support for use in the purification of exhaust gases comprising:
a metal substrate,
an oxide membrane formed on the surface of said substrate by treating said substrate in an oxidative atmosphere at a temperature between 800° C. and about 1200° C., said membrane containing alumina which substantially comprises active alumina, and
an active alumina layer formed on said oxide membrane,
wherein the composition of the metal substrate is composed of from 5 to 30% by weight of chromium, from 1 to 10% by weight of aluminum, from 0.01 to 0.5% by weight of one selected from the group consisting of potassium, rubidium, cesium, francium, calcium, strontium, barium, radium and a mixture thereof, from 0.01 to 0.5% by weight of lanthanoid elements and the balance of iron.

10. A monolithic catalyst support as defined in claim 9, wherein said one selected group from the group consisting of potassium, rubidium, cesium, francium, calcium, strontium, barium, radium and a mixture thereof is present in an amount from 0.1 to 10.0 mol relative to 1 mol of the lanthanoid elements and there is formed a perovskite type composite oxide represented by the general formula $R_xLn_{1-x}Al_2O_3$, wherein R is potassium, rubidium, cesium, francium, calcium, strontium, barium or radium, and Ln is one or more lanthanoid elements.

11. A monolithic catalyst for use in the purification of exhaust gases comprising:
a metal substrate,
an oxide membrane formed on the surface of said substrate by treating said substrate in an oxidative atmosphere at a temperature between 800° C. and about 1200° C., said membrane containing alumina which substantially comprises active alumina,
an active alumina layer formed on said oxide membrane, and
catalyst ingredients carried on at least said active alumina layer,
wherein the composition of the metal substrate is composed of from 5 to 30% of chromium, from 1 to 10% aluminum (Al) and from 0.01 to 0.5% by weight of one selected from the group consisting of potassium, rubidium, cesium, francium, calcium, strontium, barium, radium and a mixture thereof, from 0.01 to 0.5% by weight of lanthanoid elements, and the balance of iron.

12. A monolithic catalyst as defined in claim 11, wherein said one selected from the group consisting of potassium, rubidium, cesium, francium, calcium, strontium, barium, radium and a mixture thereof is present in an amount from 0.1 to 10.0 mol relative to 1 mol of lanthanoid elements and there is formed a perovskite type composite oxide represented by the general formula $R_xLn_{1-x}Al_2O_3$, wherein R is potassium, rubidium, cesium, francium, calcium, strontium, barium or radium, and Ln is one or more lanthanoid elements.

* * * * *